Feb. 7, 1933.  E. C. LARSON  1,896,730
AIRPLANE PROPELLER MOUNTING
Filed Sept. 16, 1931   2 Sheets-Sheet 1

INVENTOR.
EDWIN CLIFFORD LARSON.
BY Munn & Co.
ATTORNEYS.

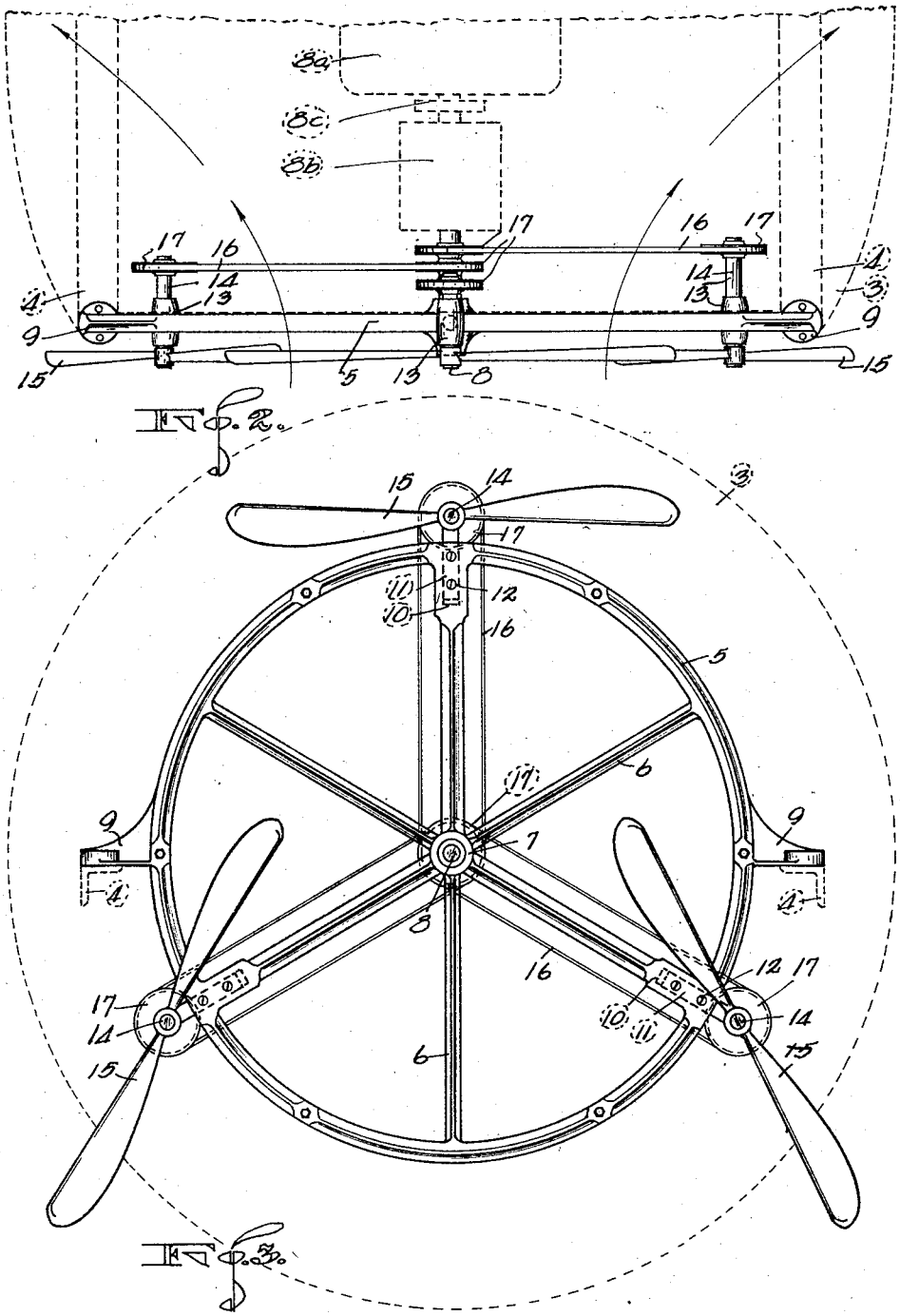

Patented Feb. 7, 1933

1,896,730

UNITED STATES PATENT OFFICE

EDWIN CLIFFORD LARSON, OF SAN FRANCISCO, CALIFORNIA, ASSIGNOR OF ONE-HALF TO JOHN F. ARNOLD, OF SAN FRANCISCO, CALIFORNIA

AIRPLANE PROPELLER MOUNTING

Application filed September 16, 1931. Serial No. 563,203.

My invention relates to improvements in propeller mountings, and it consists of the combinations, constructions and arrangements hereinafter described and claimed.

An object of my invention is to provide a propeller mounting which may be readily attached to a standard airplane fuselage, and which makes use of three propellers that are disposed about the rim of the mounting instead of the usual single propeller. The three propellers will divide the pulling strain into thirds, and this will be applied at different points, thus resulting in a more evenly balanced construction. Moreover, the propeller blades are shorter in length and are driven from a common source of power.

The device is extremely simple in construction, and is durable and efficient for the purpose intended.

Other objects and advantages will appear in the following specification, and the novel features of the device will be particularly pointed out in the appended claims.

My invention is illustrated in the accompanying drawings forming a part of this application, in which Figure 1 is a top plan view of the device shown operatively applied to an airplane;

Figure 2 is an enlarged top plan view; and

Figure 3 is a front elevation.

Figure 1:
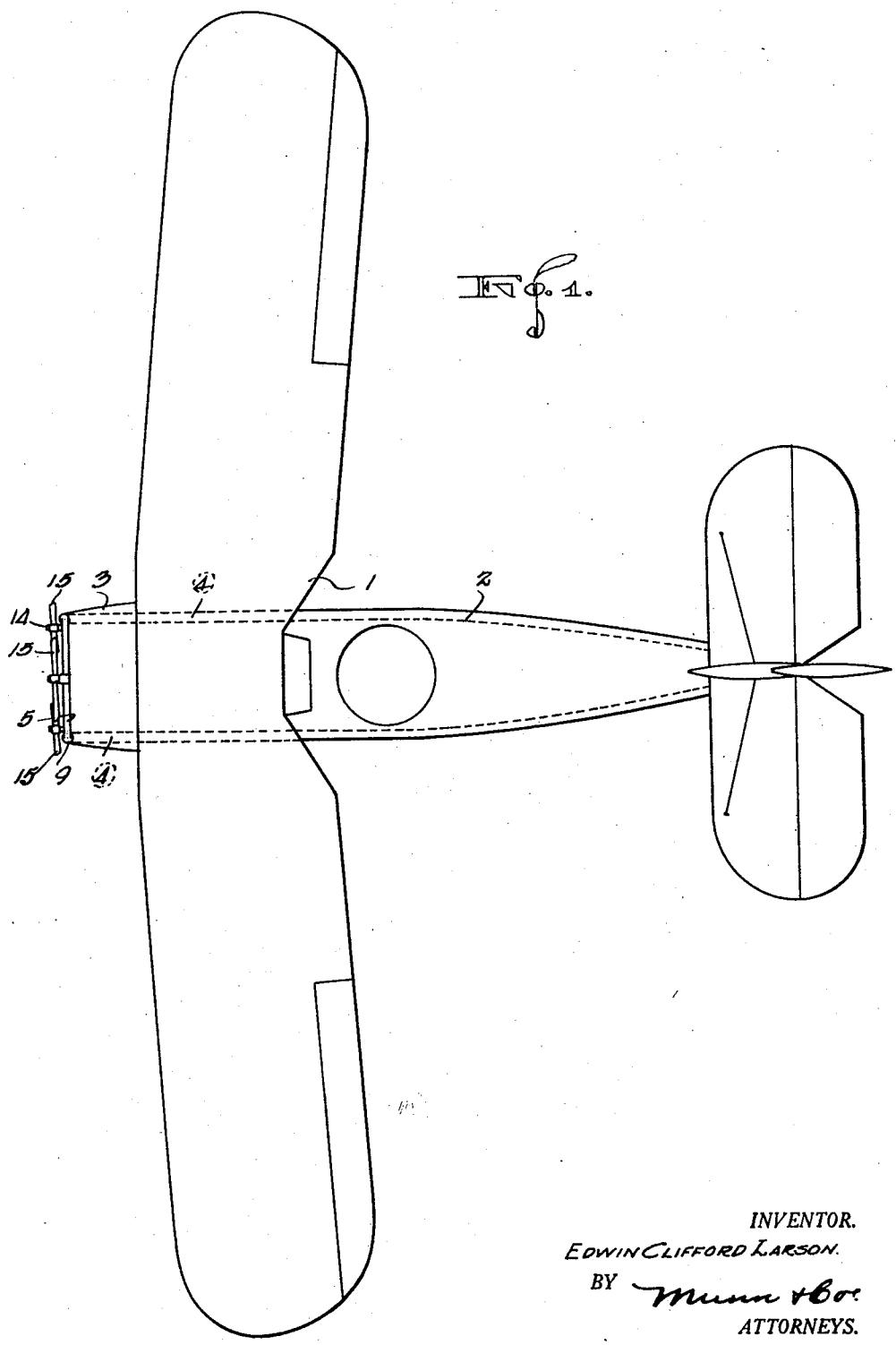

In carrying out my invention I make use of a standard airplane indicated generally at 1, and this airplane has a fuselage 2 provided with a cowling 3. I have indicated the longérons by dotted lines at 4.

The propeller mounting comprises a ring-shaped member 5 having spokes 6 extending from a central bearing 7. The drive shaft 8 from the engine 8a is journaled in the center bearing 7. The ring 5 has projections 9 that are fastened to the longérons 4. The engine 8a is connected to the shaft 8 through a transmission 8b permitting three forward speeds. Reverse speed is used for braking purposes. Long life to the motor is also a result.

Guideways 10 are provided in certain of the spokes 6 and sliding members 11 are inserted in the guides 10 and are held in adjusted position by screws 12 or other suitable fastening means. The members 11 carry bearings 13 which in turn have stub shafts 14 rotatably mounted therein. Propellers 15 are secured to the shafts 14 and the shafts are operatively connected to the drive shaft 8 by chains 16 and sprockets 17. The members 11 are adjusted radially so as to create the proper tension on the chains 16. A rotation of the shaft 8 will cause all of the propellers 15 to rotate. The axes of the propellers are disposed near the wall of the fuselage so that the pull of the propellers will be substantially along the wall and thus provide a stronger construction. The air line indicated by the arrows in Figure 2 passes through the ring 5 and out along the sides of the airplane. The ring 5 is self-supporting and may be applied quickly to the airplane or be removed therefrom. It is obvious that more than three propellers may be mounted around the ring 5 if desired. The three propellers operating from a single power source saves in weight and the expense in providing three separate engines.

The engine 8a is connected to the shaft 8 in any desired speed by the transmission 8b and the clutch 8c. Of course, the propeller speed can be increased by changing the diameter of the drive sprocket with respect to the driven sprockets.

While I have shown only the preferred form of my invention, it should be understood that various changes or modifications may be made within the scope of the appended claims without departing from the spirit of the invention.

I claim:

1. A mounting for propellers comprising a frame having a central bearing for receiving a drive shaft, radially disposed bearings secured to the frame and being adjustable only in a radial direction, propellers carried by the radial bearings, and operative connections between the drive shaft and the propellers.

2. A ring-shaped attachment having spokes therein with guideways, bearings having portions slidable in the guideways, means for securing the portions in adjusted position, and propellers carried by the bearings.

3. A ring-shaped attachment having spokes therein with guideways, bearings having portions slidable in the guideways, means for securing the portions in adjusted position, and propellers carried by the bearings and common means for actuating all of the propellers.

EDWIN CLIFFORD LARSON.